United States Patent
Baskaran et al.

(10) Patent No.: US 9,513,311 B2
(45) Date of Patent: Dec. 6, 2016

(54) INERTIAL SENSOR PENDULUM TEST APPARATUS

(71) Applicant: Intel Corporation, Santa Clara, CA (US)

(72) Inventors: Rajashree Baskaran, Seattle, WA (US); Neil Goodey, Portland, OR (US)

(73) Assignee: Intel Corporation, Santa Clara, CA (US)

(*) Notice: Subject to any disclaimer, the term of this patent is extended or adjusted under 35 U.S.C. 154(b) by 130 days.

(21) Appl. No.: 14/264,358

(22) Filed: Apr. 29, 2014

(65) Prior Publication Data

US 2015/0309070 A1     Oct. 29, 2015

(51) Int. Cl.
    *G01P 21/00*  (2006.01)
    *G01C 17/38*  (2006.01)
    *G01C 25/00*  (2006.01)

(52) U.S. Cl.
    CPC .............. *G01P 21/00* (2013.01); *G01C 17/38* (2013.01); *G01C 25/005* (2013.01)

(58) Field of Classification Search
None
See application file for complete search history.

(56) References Cited

U.S. PATENT DOCUMENTS

| 6,640,200 B1* | 10/2003 | Baum ........................... 702/142 |
| 8,830,315 B2* | 9/2014 | Kang et al. ................... 348/82 |
| 2008/0271329 A1 | 11/2008 | Voecks |
| 2012/0176492 A1 | 7/2012 | Garin |
| 2013/0085698 A1 | 4/2013 | Wade et al. |
| 2013/0107064 A1 | 5/2013 | Venkatraman et al. |
| 2013/0182098 A1* | 7/2013 | Duncan et al. ................. 348/85 |

FOREIGN PATENT DOCUMENTS

| JP | 2013-061158 A | 4/2013 |
| JP | 2013-61158 A | 4/2013 |
| TW | 200639405 A | 11/2006 |

OTHER PUBLICATIONS

Office Action and Search Report received for Taiwanese Patent Application No. 104109193, mailed on Feb. 2, 2016, 7 pages including 3 pages of English translation.
International Search Report and Written Opinion received for International Patent Application No. PCT/US2015/020041, mailed on Jun. 24, 2015, 11 pages.

* cited by examiner

*Primary Examiner* — Robert R Raevis
(74) *Attorney, Agent, or Firm* — Alpine Technology Law Group LLC (57) ABSTRACT

Briefly, in accordance with one or more embodiments, a method to test one or more sensors of a device under test may comprise capturing visual motion data of the device under test disposed on an arm of a pendulum apparatus while the arm of the pendulum apparatus is in motion, capturing data from the one or more sensors while the arm of the pending apparatus is in motion, and comparing the visual motion data with the data from the one or more sensors to determine a relationship between the visual motion data and the data from the one or more sensors.

18 Claims, 5 Drawing Sheets

INERTIAL SENSOR PENDULUM TEST APPARATUS

BACKGROUND

Electronic devices such as smart phones, tablets and portable computers may have internal sensors including accelerometers, gyroscopes and magnetometers. The sensors represent a range of fundamental technologies that are used to manufacture the sensors, and the sensors typically are not vendor to vendor compatible. Hence, the sensors may exhibit varying characteristics for noise floor, resolution and drift characteristics. For example, one vendor's magnetometer sensor may utilize Anisotropic Magneto Resistive (AMR) technology whereas another vendor's sensor may utilize high-sensitivity Hall sensors which are very different fundamental technologies offering the same or similar types of sensor data. Furthermore, inertial sensors may have variations in processing at the wafer level, packaging, and so on, that may lead to part-to-part variation in absolute values of drift and other performance parameters. In order to validate the performance of such sensors in various platforms, especially where the sensors are integrated with sensor hubs and other analytics, it may be useful to employ a simple functional test of one or more sensor capabilities post form factor integration. Such functional tests could be performed using robotics, but using complex industrial grade robotics to calibrate sensors may have drawbacks since robotics may be expensive, and the natural frequencies, dampening mechanisms, and motor noises and electromagnetic interference may be difficult to isolate from the sensors of the device under test.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but the individual elements do not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
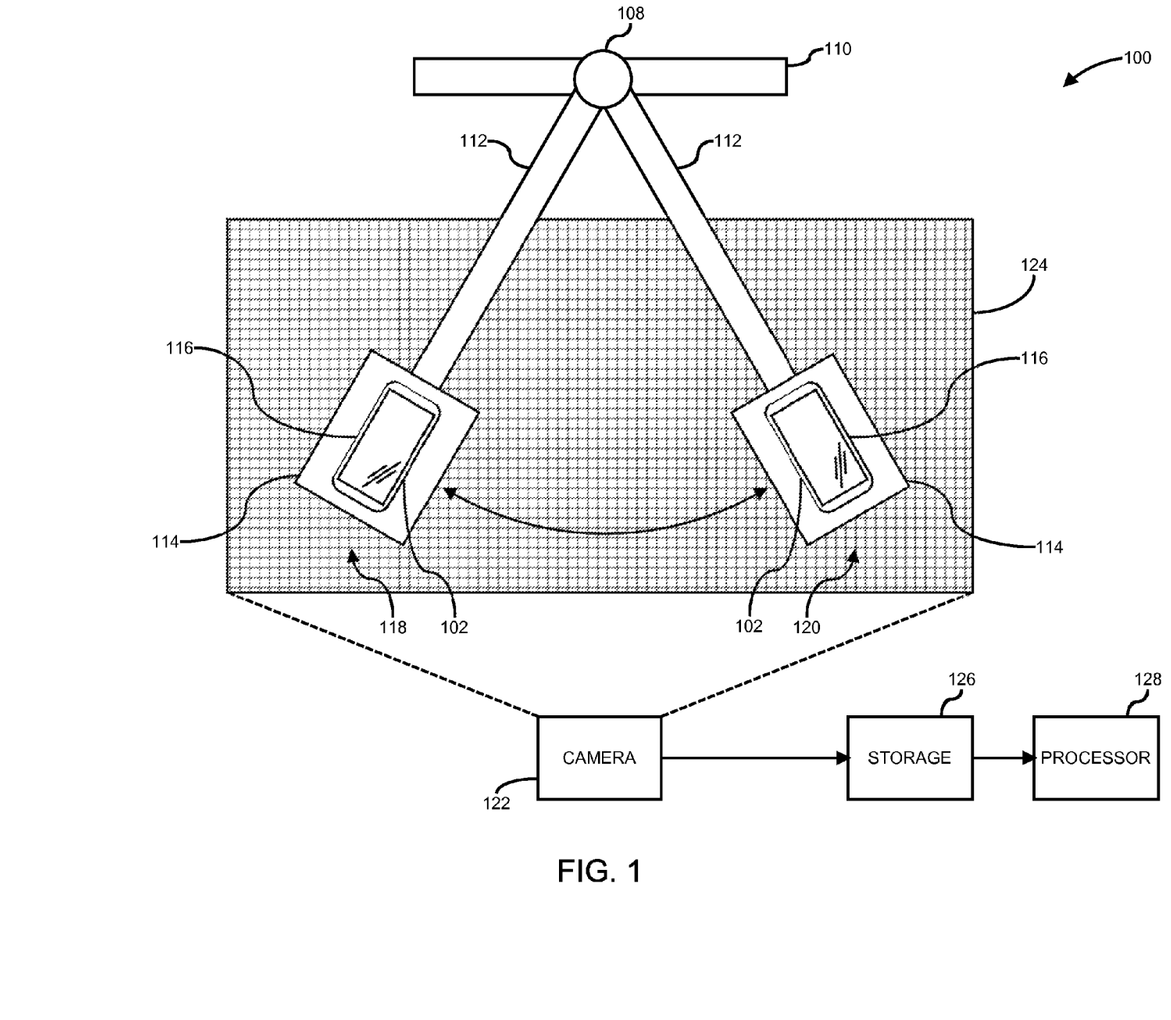
FIG. 1 is a diagram of a pendulum apparatus to test one or more sensors of an information handling system in accordance with one or more embodiments.

Referring now to FIG. 1, a diagram of a pendulum apparatus to test one or more sensors of an information handling system in accordance with one or more embodiments will be discussed. As shown in FIG. 1, pendulum apparatus 100 may comprise an arm 112 coupled to a support 110 via pivot 108 to function as a gravity pendulum. A device under test (DUT) may comprise an information handling system 116 supported on a mount 114 disposed along or at the end of arm 112 wherein the information handling system 116 includes one or more sensors 102 to be tested by pendulum apparatus 100. Information handling system 116 may comprise an electronic device such as a cellular telephone or smart phone or the like having one or more sensors 102 that may include inertial sensors such an accelerometer or a gyroscope, geomagnetic sensors such as a compass, or position sensors such as a global positioning system (GPS) sensor, among several examples. An example implementation of information handling system 116 and its respective one or more sensors 102 are shown in and described in more detail with respect to FIG. 5, below.

In one or more embodiments, the function of one or more sensors 102 of information handling system 116 may be tested and/or analyzed by affixing information handling system 116 to mount 114 wherein information handling system 116 may be affixed to mount 114 via one or more straps, fasteners, pins, ledges, tie downs, and so on, and the scope of the claimed subject matter is not limited in this respect. Once information handling system 116 is affixed to mount 114, the pendulum apparatus 100 may be put into motion by moving arm 112 to first position 118 and releasing arm 112 to allow arm 112 to swing about pivot 108 in a back and forth pendulum motion between first position 118 and second position 120, or vice versa by moving arm 112 to second position 120 and allowing arm 112 to swing about pivot 108 between second position 120 and first position 118. In one or more embodiments, the length of arm 112 may be selected in combination with the mass of arm 112, mount 114 and information handling system 116 to tune the frequency of the pendulum motion of pendulum apparatus 100, for example to match the application of interest such as the arm motion of a human arm including a full arm swing, an elbow swing, torsional pendulums for twists, and so on. Furthermore, in one or more embodiments, arm 112 and/or mount 114 may be fabricated from a material that is neither electrically conductive nor magnetically permeable, and/or that is non-paramagnetic, for example plastic or wood, so as to mitigate or avoid interference with the operation of one or more sensors 102 of information handling system. Similarly, pendulum apparatus 100 may comprise a gravity pendulum without having a motor or other drive mechanism to drive the motion of arm 112 about pivot 108 so as to avoid electromagnetic interference with the operation of one or more sensors 102 that may otherwise occur in the presence of an electrical or electromagnetically operated motor or actuator.

The operation of the one or more sensors 102 may be tested and/or analyzed by visually capturing the motion of information handling system 116 as information handling system 116 swings or moves back and forth on pendulum apparatus 100, for example wherein the motion is captured with camera 122 which may be a high-speed camera. By capturing the actual motion of the information handling system 116 as the device under test (DUT), the actual position and motion of the DUT can be compared with the output of the one or more sensors 102 to verify that the one or more sensors 102 are operating properly, and/or to accommodate for variations in the output of the one or more sensors 102 as a function of one or more parameters such as velocity, acceleration, orientation, and so on, so that any software running on information handling system 116 or any circuit or hardware receiving the output of the one or more sensors 102 as an input to the circuit or hardware may accommodate the varying behavior of the function of the one or more sensors 102 with respect to one or more other parameters. For example, if the analysis of the operation of an accelerometer sensor of DUT experiences a deviation of 1% from the actual acceleration as determined by the visual data after every 3.5 seconds of operation, then the software running on information handling system 116 may take this variation into account and adjust the acceleration information accordingly. The visual motion data may represent the actual or "ground truth" data, and the data captured from the one or more sensors 102 of the DUT may represent the tested data to be compared with the actual or "ground truth" data. A test background 124 having a grid pattern, markers, or reticle, may be placed behind the DUT with respect to the position of camera 122 to facilitate measurements of the actual position, speed and/or acceleration data captured by camera 122 as visual data. The visual data captured by camera 122 may be stored in a storage 126 such as a hard disk drive or semiconductor storage medium which in turn may be processed by a processor 128, for example a processor of a computing platform such as a personal computer or server, which in turn itself may comprise a form of information handling system as shown in and described with respect to FIG. 5, below. It should be noted that storage 126 may be disposed within camera 122, either as permanent or semi-permanent internal storage or as a removable storage device or medium, storage 126 may be disposed within or coupled to processor 128, either as permanent or semi-permanent internal storage or as a removable storage device or medium, or storage 128 may be an external storage device external to both camera 122 and processor 128, and the scope of the claimed subject matter is not limited in these respects.

Pendulum apparatus 100 in accordance with one or more embodiments as shown in FIG. 1 may comprise a simple gravity pendulum having a fixed linear arm 112. Alternatively, arm 112 may comprise other shapes and/or have articulated movements, for example as shown in and described with respect to FIG. 2, below.

Figure 2:
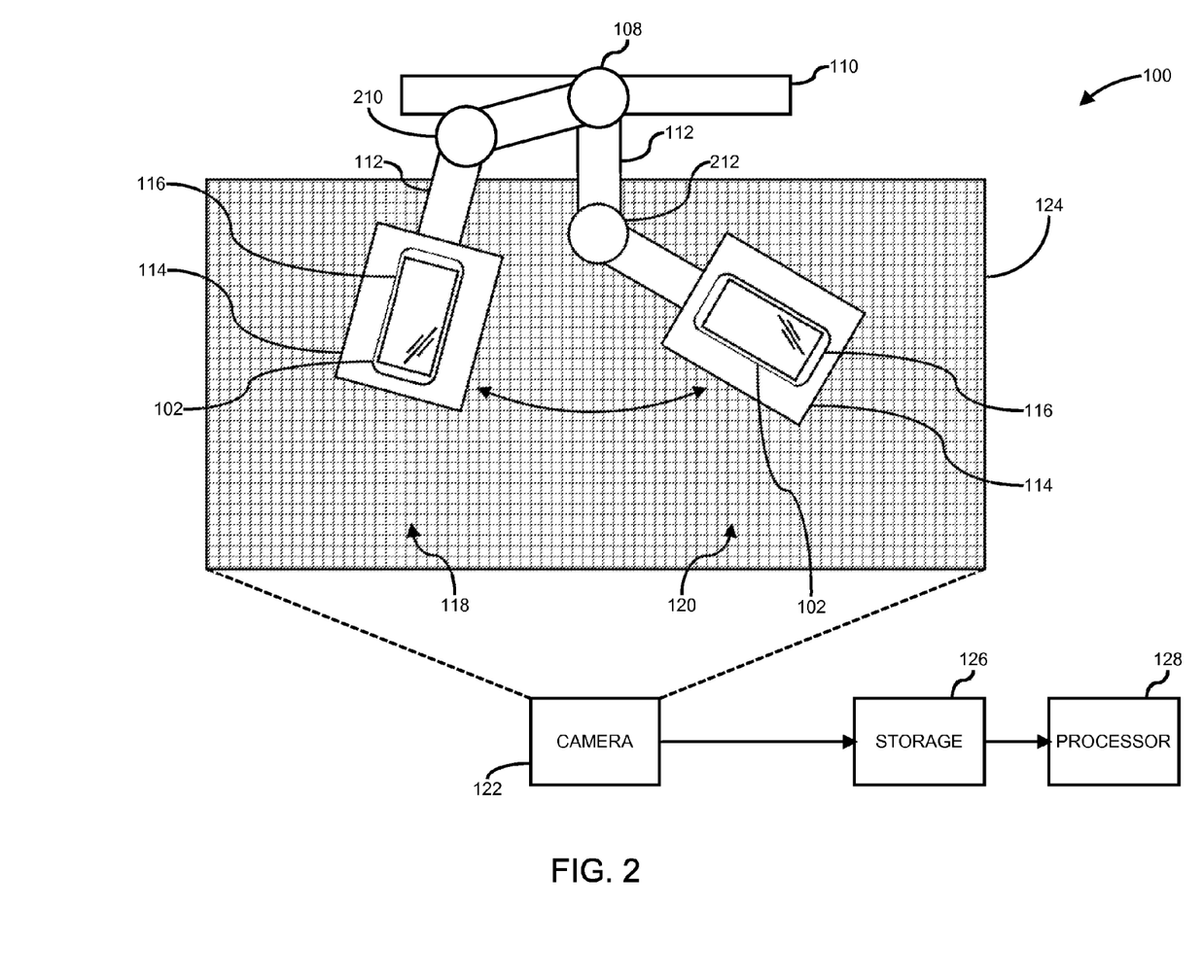
FIG. 2 is a diagram of a pendulum apparatus having an articulated arm in accordance with one or more embodiments.

Referring now to FIG. 2, a diagram of a pendulum apparatus having an articulated arm in accordance with one or more embodiments will be discussed. In contrast to the fixed arm 112 of pendulum apparatus 100 of FIG. 1, pendulum apparatus 100 of FIG. 2 may include an articulated arm 112 wherein arm 112 may include one or more pivots 210 along the length of arm 112 to allow for additional movements of information handling system 116 as the device under test (DUT). For example, arm 112 may include pivot 210 so that the DUT may move with pendulum motion about pivot 108 and pivot 210 simultaneously. Such an arrangement may allow more complex motion of the one or more sensors 102 to be tested. In one or more embodiments, such multi-pivot motion of pendulum apparatus 100 may be designed to model the movements of a human arm holding information handling system 116 to model real use applications of the one or more sensors 102. In one or more particular embodiments, pivot 210 may include one or more springs and/or one or more stops so that the range of motion of the DUT about pivot 210 may be dampened and/or restricted in the range of available motion in order to more closely simulate the movement of a human elbow joint. Similarly, pivot 108 may include one or more springs and/or one or more stops so that the range of motion of the DUT about pivot 108 may be dampened and/or restricted in the range of available motion in order to simulate the movement of a human shoulder joint. Although not shown, one or more additional pivots may be included along arm 112, for example a pivot at the interface between the end of arm 112 and mount 114 to simulate the movement of a human wrist joint. Likewise, pivot 108 of FIG. 1 may include such springs and/or stops to dampen and/or restrict the range of movement of arm 112 as it swings about pivot 108. It should be noted that the pivots, springs, and/or stops are merely example mechanisms to control the movement of arm 112 in a desired fashion, and the scope of the claimed subject matter is not limited in these respects. Furthermore, although the pendulum apparatus 100 as shown in FIG. 1 and in FIG. 2 illustrates movement of the DUT in two dimensions, pendulum apparatus 100 may also be configured to allow for movement of the DUT in three dimensions as shown in and described with respect to FIG. 3, below.

Figure 3:
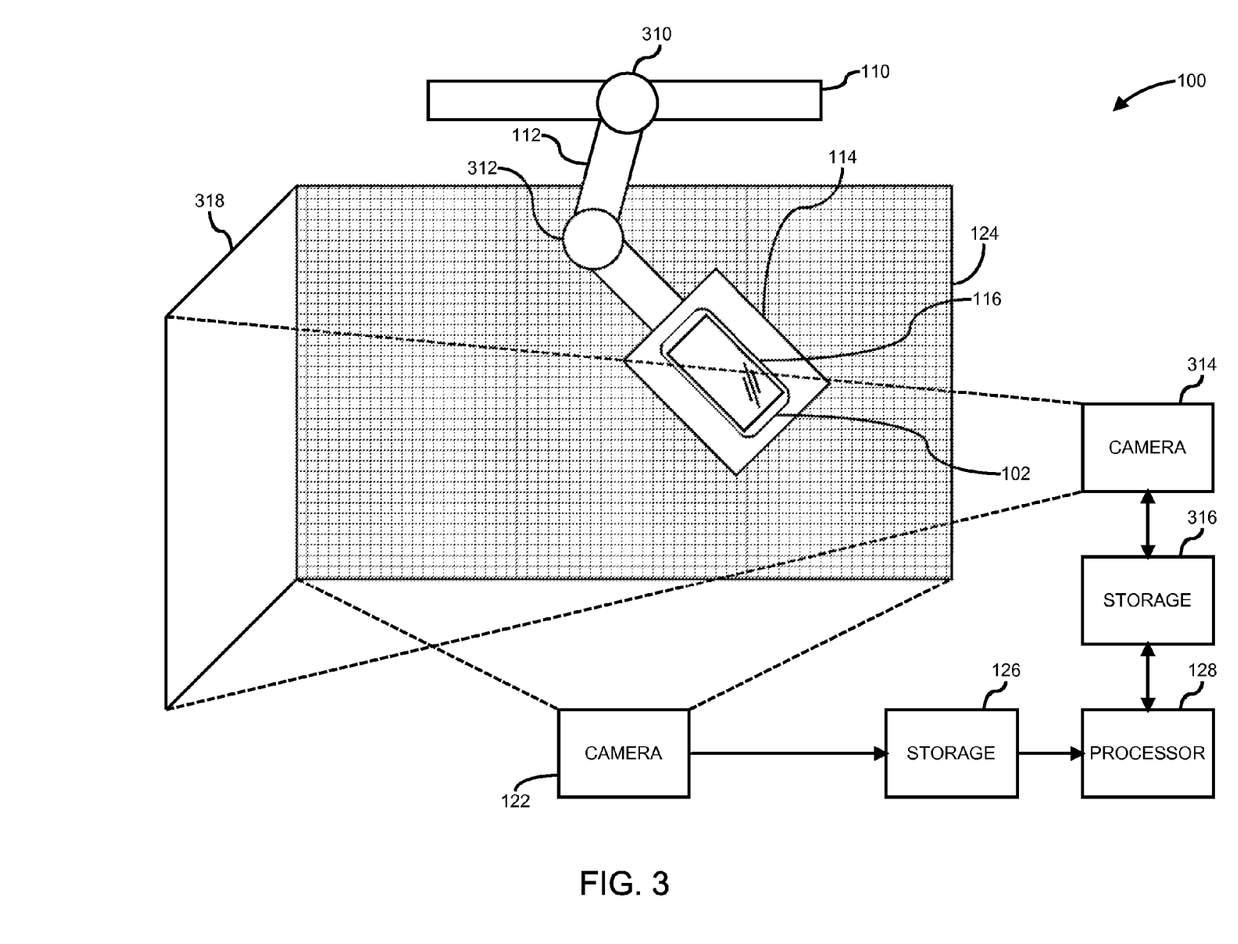
FIG. 3 is a diagram of a pendulum apparatus having an articulated arm to allow motion in three dimensions in accordance with one or more embodiments.

Referring now to FIG. 3, a diagram of a pendulum apparatus having an articulated arm to allow motion in three dimensions in accordance with one or more embodiments will be discussed. As shown in FIG. 3, pendulum apparatus 100 may include one or more pivots such as pivot 310 and/or pivot 312 that allow movement of the arm 112 in multiple degrees of freedom so that information handling system 116 as the device under test (DUT) may experience movement in three dimensions. In such an arrangement, camera 122 may visually capture the movement of the DUT with respect to test background 124, and camera 314 may visually capture the movement of the DUT with respect to background 318 so that the movement of the DUT in three dimensional space may be captured. The visual motion data captured by camera 122 may be stored in storage 126 and the visual motion captured by camera 314 may be stored in storage 316 so that the visual motion data may be analyzed and processed by processor 128. In one or more embodiments, both camera 122 and camera 314 may share a single storage device so that two separate storage devices are not required, and the scope of the claimed subject matter is not limited in this respect. After the test is completed, processor 128 may execute a method to test one or more sensors 102 of information handling system and compare the test data to the visual data captured by camera 122 and/or camera 314 as shown in and described with respect to FIG. 4, below.

Figure 4:
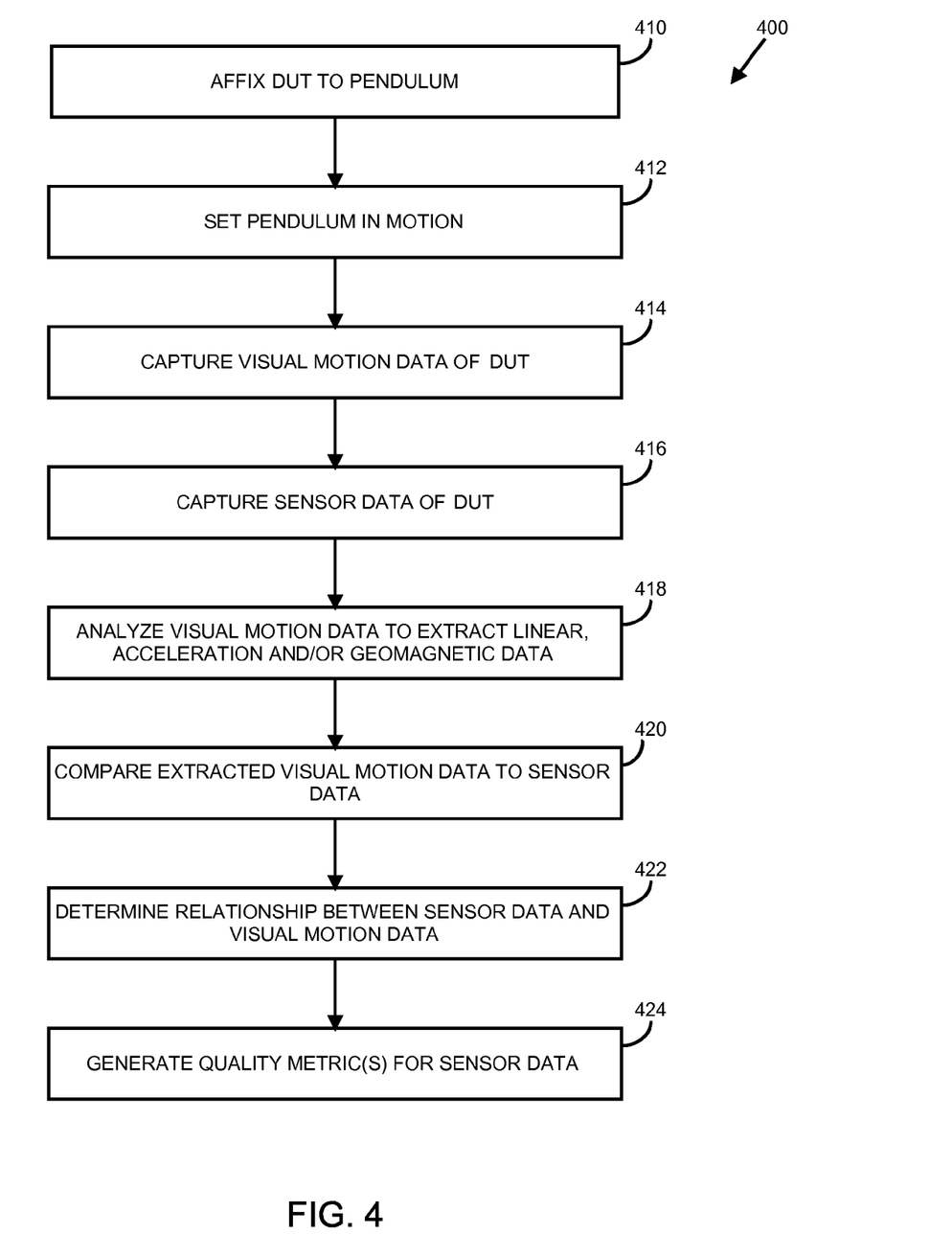
FIG. 4 is a diagram of a method to test one or more sensors of an information handling system using a pendulum apparatus in accordance with one or more embodiments.

Referring now to FIG. 4, a diagram of a method to test one or more sensors of an information handling system using a pendulum apparatus in accordance with one or more embodiments will be discussed. Method 400 of FIG. 4 may be realized at least in part as software and/or instructions running on a machine, a computing platform, or a processor such as processor 128, for example as software or instructions executed by an information handling system such as information handling system 500 as shown in and described with respect to FIG. 5, below. Furthermore, although method 400 of FIG. 4 is shown as having one particular order, various other orders may be implemented, with more or fewer blocks than shown in FIG. 4, and the scope of the claimed subject matter is not limited in these respects. At block 410, the device under test (DUT) may be affixed to pendulum apparatus 100 for example by affixing information handling system 116 to mount 114. The pendulum apparatus 100 may then be set into motion at block 412, and the visual motion data of the DUT may be captured at block 414, for example with camera 122.

The sensor data of one or more sensors 102 of the DUT may be captured at block 416 while the pendulum apparatus 100 is in motion. After the visual motion data and the sensor data have been captured, or optionally concurrently with the capturing of the data, the visual motion data may be analyzed at block 418 in order to extract linear, position, acceleration, and/or geomagnetic data so that such extracted data may be compared with the data from the one or more sensors 102 of the DUT at block 420. The relationship between the sensor data and the visual motion data may be determined at block 422 and logged, for example so that software and/or hardware devices of information handling system 116 may utilize the relationship information during use of the one or more sensors 102, and/or to verify that the one or more sensors are operating properly, for example within a desired tolerance. Such comparisons may include, for example, accelerometer readings of acceleration versus time of the motion, accelerometer versus pendulum swing angle, gyroscope readings versus time of the motion, gyroscope readings versus pendulum angle, and so on, and the scope of the claimed subject matter is not limited in these respects. Optionally, one or more quality metrics for the sensor data may be generated at block 424 in order to provide an indication of the quality and/or usefulness of the data from the one or more sensors 102.

Figure 5:
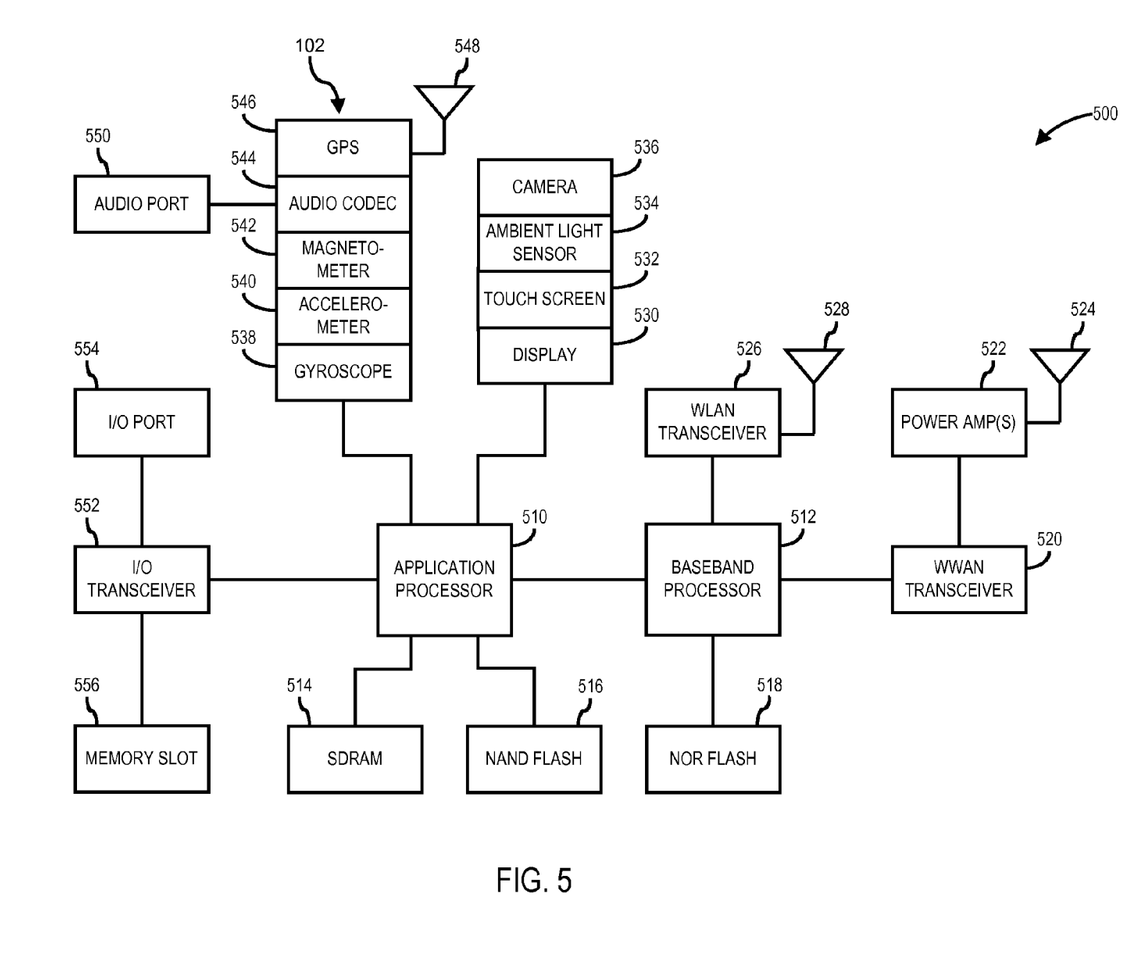
FIG. 5 is a block diagram of an information handling system having one or more sensors capable to be tested by a pendulum apparatus in accordance with one or more embodiments.

Referring now to FIG. 5, a block diagram of an information handling system having one or more sensors capable to be tested by a pendulum apparatus in accordance with one or more embodiments will be discussed. Information handling system 500 of FIG. 5 may tangibly embody at least in part any one or more of the elements described herein, above, including for example information handling system 116, camera 122, storage 126, processor 128, camera 314, and/or storage 316, with greater or fewer components depending on the hardware specifications of the particular device. Although information handling system 500 represents one example of several types of computing platforms, information handling system 500 may include more or fewer elements and/or different arrangements of elements than shown in FIG. 5, and the scope of the claimed subject matter is not limited in these respects.

In one or more embodiments, information handling system 500 may include an application processor 510 and a baseband processor 512. Application processor 510 may be utilized as a general-purpose processor to run applications and the various subsystems for information handling system 500. Application processor 510 may include a single core or alternatively may include multiple processing cores wherein one or more of the cores may comprise a digital signal processor or digital signal processing (DSP) core. Furthermore, application processor 510 may include a graphics processor or coprocessor disposed on the same chip, or alternatively a graphics processor coupled to application processor 510 may comprise a separate, discrete graphics chip. Application processor 510 may include on board memory such as cache memory, and further may be coupled to external memory devices such as synchronous dynamic random access memory (SDRAM) 514 for storing and/or executing applications during operation, and NAND flash 516 for storing applications and/or data even when information handling system 500 is powered off. In one or more embodiments, instructions and/or software to operate or configure the information handling system 500 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 512 may control the broadband radio functions for information handling system 500. Baseband processor 512 may store code for controlling such broadband radio functions in a NOR flash 518. Baseband processor 512 controls a wireless wide area network (WWAN) transceiver 520 which is used for modulating and/or demodulating broadband network signals, for example for communicating via a 3GPP LTE or LTE-Advanced network or the like.

In general, WWAN transceiver 520 may operate according to any one or more of the following radio communication technologies and/or standards including but not limited to a Global System for Mobile Communications (GSM) radio communication technology and/or a Third Generation Partnership Project (3GPP) radio communication technology such as Long Term Evolution Advanced (4th Generation) (LTE Advanced (4G)), and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 520 couples to one or more power amps 522 respectively coupled to one or more antennas 524 for sending and receiving radio-frequency signals via the WWAN broadband network. The baseband processor 512 also may control a wireless local area network (WLAN) transceiver 526 coupled to one or more suitable antennas 528 and which may be capable of communicating via a Wi-Fi, Bluetooth®, and/or an amplitude modulation (AM) or frequency modulation (FM) radio standard including an IEEE 802.11a/b/g/n standard or the like. It should be noted that these are merely example implementations for application processor 510 and baseband processor 512, WWAN transceiver 520, and/or WLAN transceiver 526, and the scope of the claimed subject matter is not limited in these respects. In addition, any one or more of SDRAM 514, NAND flash 516 and/or NOR flash 518 may comprise other types of memory technology such as magnetic memory, chalcogenide memory, phase change memory, or ovonic memory, and the scope of the claimed subject matter is not limited in this respect.

In one or more embodiments, application processor 510 may drive a display 530 for displaying various information or data, and may further receive touch input from a user via a touch screen 532 for example via a finger or a stylus. An ambient light sensor 534 may be utilized to detect an amount of ambient light in which information handling system 500 is operating, for example to control a brightness or contrast value for display 530 as a function of the intensity of ambient light detected by ambient light sensor 534. One or more cameras 536 may be utilized to capture images that are processed by application processor 510 and/or at least temporarily stored in NAND flash 516. Furthermore, application processor 510 may couple to one or more sensors 102 including but not limited to a gyroscope 538, accelerometer 540, magnetometer 542, audio coder/decoder (CODEC) 544, and/or global positioning system (GPS) controller 546 coupled to an appropriate GPS antenna 548, for detection of various environmental properties including location, movement, and/or orientation of information handling system 500. Alternatively, controller 546 may comprise a Global Navigation Satellite System (GNSS) controller. Audio CODEC 544 may be coupled to one or more audio ports 550 to provide microphone input and speaker outputs either via internal devices and/or via external devices coupled to information handling system via the audio ports 550, for example via a headphone and microphone jack. In addition, application processor 510 may couple to one or more input/output (I/O) transceivers 552 to couple to one or more I/O ports 554 such as a universal serial bus (USB) port, a high-definition multimedia interface (HDMI) port, a serial port, and so on. Furthermore, one or more of the I/O transceivers 552 may couple to one or more memory slots 556 for optional removable memory such as secure digital (SD) card or a subscriber identity module (SIM) card, although the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to an inertial sensor pendulum test apparatus and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A pendulum system to test one or more sensors of a device under test, the apparatus comprising:
    an arm coupled to a support via a first pivot;
    a mount disposed on the arm to which the device under test may be affixed;
    an imager to capture visual motion data of the device under test while the arm of the pendulum apparatus is in motion; and
    a processor to compare the visual motion data with data captured from one or more sensors of the device under test to determine a relationship between the visual motion data and the data from the one or more sensors.

2. A pendulum system as claimed in claim 1, further comprising a test background to facilitate the imager in capturing the visual motion data of the device under test.

3. A pendulum system as claimed in claim 1, further comprising:
    a second pivot disposed on the arm to allow articulation of the arm with respect to the first pivot and the second pivot.

4. A pendulum system as claimed in claim 1, wherein the first pivot allows for pendulum motion of the device under test in three dimensions.

5. A pendulum system as claimed in claim 1, wherein the pendulum is a gravity driven pendulum.

6. A pendulum system as claimed in claim 1, wherein the arm, the mount, or the pivot, or combinations thereof, comprise a material that is electrically non-conductive, magnetically non-permeable, or magnetically non-paramagnetic, or combinations thereof.

7. A method to test one or more sensors of a device under test, the method comprising:
    capturing visual motion data of the device under test disposed on an arm of a pendulum apparatus while the arm of the pendulum apparatus is in motion;
    capturing data from the one or more sensors while the arm of the pendulum apparatus is in motion; and
    comparing the visual motion data with the data from the one or more sensors to determine a relationship between the visual motion data and the data from the one or more sensors.

8. A method as claimed in claim 7, wherein said capturing visual motion data is performed with a camera.

9. A method as claimed in claim 7, further comprising storing the captured data of the device under test in a first storage device of the device under test and storing the visual motion data in a second storage device.

10. A method as claimed in claim 7, further comprising analyzing the visual motion data to extract linear data, position data, acceleration data, or geomagnetic data, or combinations thereof, wherein said comparing comprises comparing the extracted data with the data from the one or more sensors.

11. A method as claimed in claim 7, wherein the pendulum apparatus is a gravity pendulum.

12. A method as claimed in claim 7, wherein said capturing visual motion data comprises capturing the motion of the device under test as the device under test moves in three dimensions.

13. An article of manufacture comprising a non-transitory medium having instructions stored thereon that, if executed by a machine, configure the machine to perform:
    capturing visual motion data of a device under test disposed on an arm of a pendulum apparatus while the arm of the pendulum apparatus is in motion;
    capturing data from the one or more sensors while the arm of the pending apparatus is in motion; and
    comparing the visual motion data with the data from the one or more sensors to determine a relationship between the visual motion data and the data from the one or more sensors.

14. An article of manufacture as claimed in claim 13, wherein said capturing is performed with a camera.

15. An article of manufacture as claimed in claim 13, wherein the instructions, if executed, further result in storing the captured data of the device under test in a first storage device of the device under test and storing the visual motion data in a second storage device.

16. An article of manufacture as claimed in claim 13, wherein the instructions, if executed, further result in analyzing the visual motion data to extract linear data, position data, acceleration data, or geomagnetic data, or combinations thereof, wherein said comparing comprises comparing the extracted data with the data from the one or more sensors.

17. An article of manufacture as claimed in claim 13, wherein the pendulum apparatus is a gravity pendulum.

18. An article of manufacture as claimed in claim 13, wherein said capturing visual motion data comprises capturing the motion of the device under test as the device under test moves in three dimensions.

\* \* \* \* \*